United States Patent
Son et al.

(10) Patent No.: US 9,551,240 B2
(45) Date of Patent: Jan. 24, 2017

(54) SYSTEM OF RECYCLING EXHAUST HEAT FROM INTERNAL COMBUSTION ENGINE

(71) Applicant: Hyundai Motor Company, Seoul (KR)

(72) Inventors: You Sang Son, Suwon-si (KR); Kyoung Heo, Anyang-si (KR)

(73) Assignee: Hyundai Motor Company, Seoul (KR)

( * ) Notice: Subject to any disclaimer, the term of this patent is extended or adjusted under 35 U.S.C. 154(b) by 135 days.

(21) Appl. No.: 14/480,501

(22) Filed: Sep. 8, 2014

(65) Prior Publication Data

US 2015/0184551 A1 Jul. 2, 2015

(30) Foreign Application Priority Data

Dec. 27, 2013 (KR) .......................... 10-2013-0165243

(51) Int. Cl.
*F02B 33/44* (2006.01)
*F02G 3/00* (2006.01)
(Continued)

(52) U.S. Cl.
CPC ............... *F01K 23/065* (2013.01); *F01K 5/02* (2013.01); *F01K 7/16* (2013.01); *F01K 23/10* (2013.01);
(Continued)

(58) Field of Classification Search
CPC ............ F01K 23/065; F01K 5/02; F01K 7/16; F01K 23/10; F01K 23/14; F01N 5/02; F01P 3/2285; F02G 5/04
(Continued)

(56) References Cited

U.S. PATENT DOCUMENTS

2009/0211253 A1* 8/2009 Radcliff ................ F01K 23/065
60/670
2009/0241543 A1* 10/2009 Ernst ........................ F01K 9/04
60/645
(Continued)

FOREIGN PATENT DOCUMENTS

CN          101566113 A  * 10/2009 ............. F01K 23/10
EP          2 436 888 A1     4/2012
(Continued)

OTHER PUBLICATIONS

Machine translation of Yamaguchi Takuya et al. (Pub. No. JP 2013-181394 A), published on Sep. 12, 2013.*

*Primary Examiner* — Thai Ba Trieu
(74) *Attorney, Agent, or Firm* — Morgan, Lewis & Bockius LLP

(57) ABSTRACT

A system of recycling exhaust heat from an internal combustion engine may include an EGR line circulating a portion of exhaust gas generated from the engine to an intake side, a working fluid circulating line configured to have a working fluid satisfying a Rankine cycle, which is circulated therein, and an EGR side heat exchanging unit configured to perform a heat-exchange between an EGR gas flowing in the EGR line and the working fluid flowing in the working fluid circulating line. When a temperature of the EGR gas is equal to or greater than a reference temperature T1, the EGR gas is circulated to the intake side via the EGR side heat exchanging unit, and when the temperature of the EGR gas is less than the reference temperature T1, the EGR gas is circulated to the intake side without passing through the EGR side heat exchanging unit.

9 Claims, 1 Drawing Sheet

(51) Int. Cl.
*F01K 23/10* (2006.01)
*F01K 23/06* (2006.01)
*F01N 5/02* (2006.01)
*F02G 5/04* (2006.01)
*F01K 7/16* (2006.01)
*F01K 23/14* (2006.01)
*F01K 5/02* (2006.01)

(52) U.S. Cl.
CPC ............... *F01K 23/14* (2013.01); *F01N 5/02* (2013.01); *F02G 5/04* (2013.01); *F02M 26/25* (2016.02); *F02G 2260/00* (2013.01); *Y02T 10/16* (2013.01); *Y02T 10/166* (2013.01)

(58) Field of Classification Search
USPC ............... 60/605.2, 607–608, 616, 618, 670
See application file for complete search history.

(56) References Cited

U.S. PATENT DOCUMENTS

| | | | | |
|---|---|---|---|---|
| 2011/0209473 A1* | 9/2011 | Fritz | ............... | F01K 23/065 60/618 |
| 2012/0192560 A1* | 8/2012 | Ernst | ............... | F01K 23/065 60/616 |
| 2013/0125545 A1* | 5/2013 | Geskes | ............... | F01K 23/065 60/618 |
| 2013/0199178 A1* | 8/2013 | Kanou | ............... | F01K 23/065 60/605.2 |
| 2013/0219880 A1* | 8/2013 | Irmler | ............... | F01K 23/065 60/597 |
| 2014/0034002 A1* | 2/2014 | Bromberg | ............ | F01K 23/065 123/1 A |
| 2014/0116374 A1* | 5/2014 | Brown | ............... | F02D 19/00 60/605.2 |
| 2015/0176465 A1* | 6/2015 | Son | ............... | F01K 23/065 60/597 |
| 2015/0176466 A1* | 6/2015 | Son | ............... | F01K 23/065 60/597 |

FOREIGN PATENT DOCUMENTS

| | | |
|---|---|---|
| JP | 2004-11562 A | 1/2004 |
| JP | 2008-38803 A | 2/2008 |
| JP | 2012-7500 A | 1/2012 |
| JP | 2013-76397 A | 4/2013 |
| JP | 2013-181394 A | 9/2013 |
| JP | 2013-217221 A | 10/2013 |
| KR | 2002-0049999 A | 6/2002 |
| WO | WO 2012/088532 A1 | 6/2012 |
| WO | WO 2012/102700 A1 | 8/2012 |
| WO | WO 2013/046888 A1 | 4/2013 |
| WO | WO 2013/049438 A2 | 4/2013 |

* cited by examiner

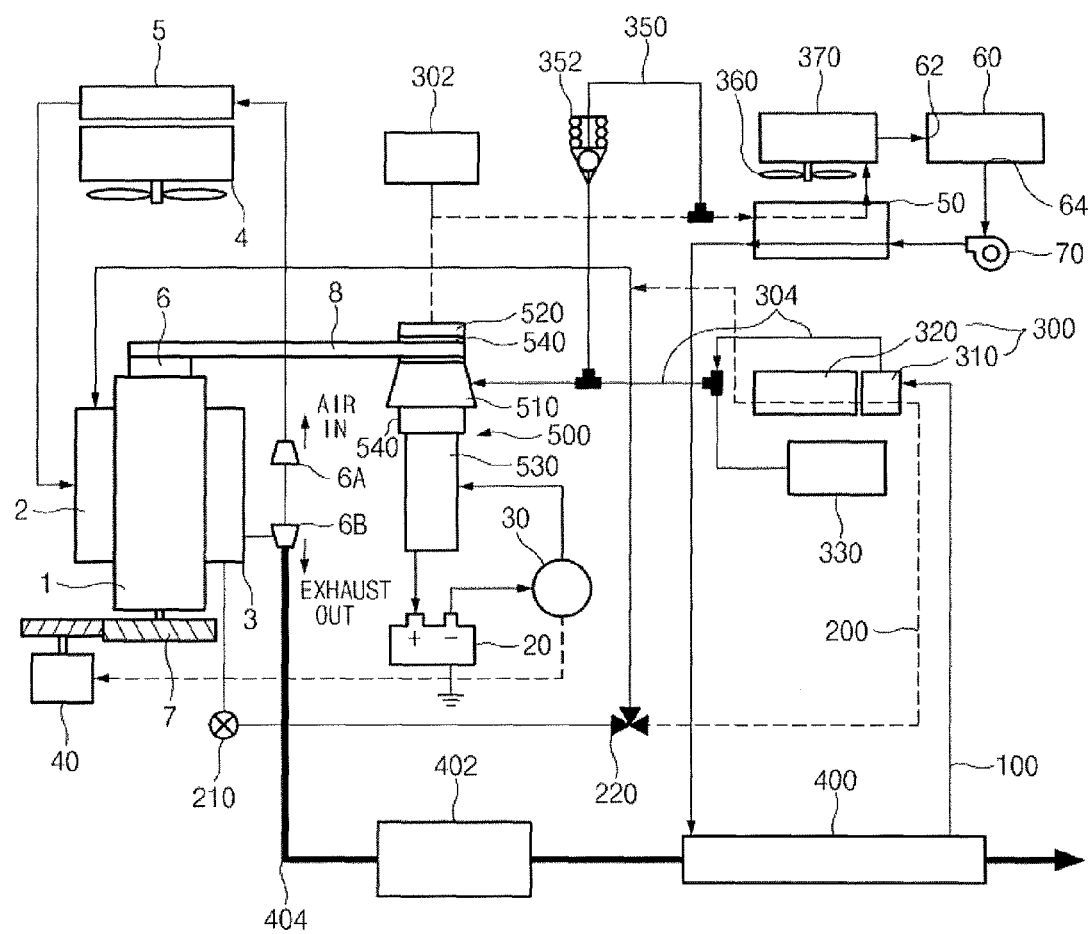

SYSTEM OF RECYCLING EXHAUST HEAT FROM INTERNAL COMBUSTION ENGINE

CROSS-REFERENCE TO RELATED APPLICATION

The present application claims priority of Korean Patent Application Number 10-2013-0165243 filed on Dec. 27, 2013, the entire contents of which application are incorporated herein for all purposes by this reference.

BACKGROUND OF INVENTION

Field of Invention

The present invention relates to a system of recycling exhaust heat from an internal combustion engine, and more particularly, to a system of recycling exhaust heat from an internal combustion engine including a recycling scheme circulating a working fluid using exhaust heat from the internal combustion engine.

Description of Related Art

An internal combustion engine is widely used in a vehicle, a ship, a small generator, and the like, and an attempt to increase efficiency of the internal combustion engine has been continuously conducted. The internal combustion engine generally discharges much heat as exhaust heat, and several systems collecting the exhaust heat to increase entire efficiency of the internal combustion engine have been developed.

When considering an apparatus and parts, an increase in load, and the like necessary to configure a system of collecting an exhaust heat, it is more efficient to mount a system of recycling exhaust heat in a large vehicle having large displacement and capable of carrying many people or cargo rather than a small vehicle having small displacement and which is light.

In a case of the vehicle, the system of recycling the exhaust heat includes a system using a turbo-compound and a system using a thermoelectric element.

The system using the turbo-compound is a scheme by attaching an exhaust turbine to an exhaust line and rotating the exhaust turbine by exhaust pressure to obtain an output, wherein this scheme may increase thermal efficiency of the entire system having the internal combustion engine installed therein, but may decrease the output of the engine itself due to the exhaust turbine acting as an exhaust resistance.

The system using the thermoelectric element uses a scheme of charging electric using the thermoelectric element generating electric using a temperature difference or assisting the engine by driving an auxiliary motor using the generated electric. However, since cost of the thermoelectric element itself is negligible and a space in which the thermoelectric element may be mounted is narrow, it is difficult to significantly increase thermal efficiency of the engine even though the thermoelectric element is actually mounted in a mass-produced vehicle.

In order to solve the above-mentioned problem and/or other problems, inventors of the present invention have developed a system of recycling exhaust heat circulating a working fluid using heat transferred from an exhaust side of the internal combustion engine and rotating the turbine using the working fluid. However, it is noted that the system of recycling the exhaust heat is not published to those without having the duty of confidentiality based on the point of time at which the present invention is filed.

It was expected that it is necessary to maximally increase an operating time of the turbine by circulating the working fluid as long as possible in order to increase efficiency of the system of recycling the exhaust heat and an experiment was performed accordingly. However, in the case in which the working fluid is circulated even when a temperature of the engine is low, it was found that fuel efficiency of the vehicle having the engine mounted therein is deteriorated. Therefore, a necessity of optimally setting a section in which the turbine is operated by circulating the working fluid has been increased.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

Accordingly, the present invention has been made to solve the above-mentioned problems occurring in the prior art and/or other problems while advantages achieved by the prior art are maintained intact.

The present invention is directed to provide a system of recycling exhaust heat from an internal combustion engine capable of achieving good fuel efficiency by deriving an optimal condition of circulating a working fluid or stopping the circulation thereof. Also, the present invention is directed to provide a system of recycling exhaust heat enabling torque of a turbine generated by the working fluid to be used as an application suitable for the internal combustion engine.

In various aspects of the present invention, there is provided a system of recycling exhaust heat from an internal combustion engine, the system including: an EGR line configured to circulate a portion of an exhaust gas generated from the internal combustion engine to an intake side, a working fluid circulating line configured to have a working fluid satisfying a Rankine cycle, which is circulated therein, and an EGR side heat exchanging unit configured to perform a heat-exchange between an EGR gas flowing in the EGR line and the working fluid flowing in the working fluid circulating line, wherein when a temperature of the EGR gas is equal to or greater than a reference temperature $T_1$, the EGR gas is circulated to the intake side via the EGR side heat exchanging unit, and when the temperature of the EGR gas is less than the reference temperature $T_1$, the EGR gas is circulated to the intake side without passing through the EGR side heat exchanging unit.

The system may further include an EGR side bypass valve configured to be installed in the EGR line to thereby change a path of the EGR gas. The reference temperature $T_1$ may be 500° C.

The system may further include a working fluid pump configured to pump the working fluid from a reservoir tank having the working fluid stored therein to thereby supply the pumped working fluid to the working fluid circulating line, wherein the working fluid pump is operated only when the temperature of the EGR gas is equal to or greater than the reference temperature $T_1$.

The system may further include a turbine generating unit configured to have a turbine which is rotated by receiving energy from the working fluid circulating line. The turbine generating unit may further include a motor generator, and the motor generator may drive a rotation shaft installed in the internal combustion engine by directly using rotational energy of the turbine or convert the rotational energy into electrical energy when the temperature of the EGR gas is equal to or greater than the reference temperature T1, and may drive the rotation shaft installed in the internal combustion engine by receiving power from a battery when the temperature of the EGR gas is less than the reference temperature T1.

The turbine generating unit may further include a pulley and a clutch, the turbine and a rotor of the motor generator may be coaxially connected to each other, and the clutch may intermit the turbine and the pulley.

The turbine generating unit may further include a second clutch capable of mechanically intermitting the turbine and the motor generator, and when the battery is over-charged in a case in which the working fluid rotates the turbine, the second clutch may mechanically release the turbine and the motor generator from each other.

The turbine rotated in a state in which it is mechanically released from the motor generator by the second clutch may drive the rotation shaft installed in the internal combustion engine.

When a voltage of the battery is dropped to or below a preset charge initiating reference voltage in a case in which the working fluid rotates the turbine, the second clutch may mechanically connect the turbine and the motor generator to each other.

The system may further include an exhaust side heat exchanging unit configured to be installed at an exhaust line discharging the exhaust gas to an outside to thereby transfer heat from the exhaust gas to the working fluid. The exhaust side heat exchanging unit may be disposed at a higher side of the working fluid circulating line than the EGR side heat exchanging unit. The working fluid may always pass through the exhaust side heat exchanging unit.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 1 is a conceptual view of an exemplary system of recycling exhaust heat from an internal combustion engine according to the present invention.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Terms and words used in the present specification and claims are not to be construed as a general or dictionary meaning but are to be construed as meaning and concepts meeting the technical ideas of the present invention based on a principle that the inventors can appropriately define the concepts of terms in order to describe their own inventions in best mode.

The sizes of components illustrated in the drawings or specific portions forming the components may be exaggerated or omitted or schematically illustrated for clarity and convenience. Therefore, the size of each component does not exactly reflect its real size. Further, when it is determined that the detailed description of the known function or configuration related to the present invention may obscure the gist of the present invention, the detailed description thereof will be omitted.

FIG. 1 is a conceptual view of a system of recycling exhaust heat from an internal combustion engine according to various embodiments of the present invention. Referring to FIG. 1, the system of recycling exhaust heat from the internal combustion engine (hereinafter, referred to as 'the system of recycling') according to various embodiments of the present invention may include an EGR line 200 circulating a portion of an exhaust gas generated from the internal combustion engine to an intake side manifold, a working fluid circulating line 100 having a working fluid satisfying Rankine cycle, which is circulated therein, and an EGR heat exchanging unit 300 performing a heat-exchange between an EGR gas flowing in the EGR line 200 and the working fluid flowing in the working fluid circulating line 100. Here, Rankine cycle, which is a cycle configured of two adiabatic changes and two isobaric changes, refers to a cycle in which the working fluid involves a phase change of steam and liquid. Since Rankine cycle is one of well-known cycles, a detail description thereof will be omitted.

In addition, the system of recycling according to various embodiments of the present invention may include an exhaust she heat exchanging unit 400 installed at an exhaust line discharging an exhaust gas to the outside to thereby transfer heat from the exhaust gas to the working fluid.

The working fluid always passes through the exhaust side heat exchanging unit 400 and passes through the EGR side heat exchanging unit 300 only when a temperature of the EGR gas flowing in the EGR line 200 is equal to or greater than a reference temperature T1.

As a temperature of an engine 1 is low, a temperature of the EGR gas is also low, and as the temperature of the engine 1 is high, the temperature of the EGR gas is also high. Therefore, the temperature of the EGR gas reflects the temperature of the engine 1. Therefore, whether or not the engine 1 is pre-heated may be determined by measuring the temperature of the EGR gas, without needing to measure a temperature of a cylinder block, a head cover of the engine 1, or the like in order to determine whether or not the engine 1 is sufficiently pre-heated.

In the case in which the engine 1 is sufficiently pre-heated to circulate the working fluid to thereby rotate the turbine, when the temperature of the EGR gas reaches a certain temperature, such as 500° C., based on a diesel engine, fuel efficiency of the vehicle having the engine 1 mounted therein becomes high. Hereinafter, a circulation path through the EGR line 200 of the EGR gas will be described as an example such as when the reference temperature T1 is set to 500° C. In the case in which the temperature of the EGR gas is 500° C. or more, the EGR gas is circulated to the intake manifold via the EGR heat exchanging unit 300, and in the case in which the temperature of the EGR gas is less than 500° C., the EGR gas is circulated to the intake manifold without passing through the EGR heat exchanging unit 300.

A more detail description thereof will be provided below.

The EGR line 200 is installed with an EGR bypass valve 220 changing a path of the EGR gas. When the EGR gas applied to the EGR bypass valve 220 through an EGR valve 210 from an exhaust manifold 3 has a temperature of 500° C. or more, the EGR bypass valve 220 is opened, such that the EGR gas is moved to the right of the EGR bypass valve 220, passes through the EGR heat exchanging unit 300, and is then supplied to the intake manifold 2, based on FIG. 1. On the other hand, when the EGR gas has the temperature which is less than 500° C., the EGR bypass valve 220 is closed, such that the EGR gas is moved to an upper side of the EGR bypass valve 220 and is supplied to the intake manifold 2 without not passing through the EGR heat exchanging unit 300, based on FIG. 1.

As such, when the temperature of the exhaust gas is low such as at the time of an initial engine start, the engine 1 may be quickly pre-heated by directly introducing the EGR gas into the intake manifold 2 without passing through the EGR heat exchanging unit 300, and it is possible to prevent a phenomenon in which fuel efficiency of the engine 1 is decreased by forcedly circulating the working fluid when the engine 1 is not pre-heated from being generated.

Meanwhile, the EGR heat exchanging unit 300 thermally connects the EGR line 200 and the working fluid circulating line 100 to each other, cools the EGR gas by performing heat-exchange between the EGR gas and the working fluid, and transfers heat from the EGR gas to the working fluid. In addition, the EGR heat exchanging unit 300 has an EGR cooler 320 cooling the EGR gas and a super heater 310 transferring heat from the EGR gas to the working fluid passing through the exhaust side heat exchanging unit 400.

Hereinafter, a path in which the working fluid is circulated on the working fluid circulating line 100 will be described.

The working fluid is introduced to a working fluid pump 70 through an outlet 64 of a reservoir tank 60 storing the working fluid in a liquid state and having an inlet 62 and the outlet 64, and the working fluid pump 70 supplies the working fluid to the working fluid circulating line 100 by pumping the working fluid. As described above, since the EGR gas passes through the EGR side heat exchanging unit 300 only when the temperature of the EGR gas is the reference temperature T1 or more, it is preferable to operate the working fluid pump 70 only when the temperature of the EGR gas is the reference temperature T1 or more.

The working fluid pumped by the working fluid pump 70 is heated while passing through a recuperator 50. The working fluid passing through the recuperator 50 is supplied to the exhaust side heat exchanging unit 400 to thereby again receive heat and receives heat through a super heater 310 provided in the EGR side heat exchanging unit 300. Here, the exhaust side heat exchanging unit 400 may be formed in a structure enabling the working fluid to contact a surface of an exhaust pipe 404 and receive heat from the exhaust gas. In this case, since there is no an exhaust resistance unlike a system using a turbo compound, a phenomenon in which the output of the engine 1 itself is decreased may not be generated.

Meanwhile, the working fluid in the liquid state which is not vaporized until it passes through the super heater 310 is separated by a gas-liquid separator 330. Here, only the working fluid in a gas state passing through the super heater 310 is supplied to the turbine 510.

As such, since the working fluid receives heat from the recuperator 50 and the exhaust side heat exchanging unit 400 is disposed at an upstream side of the working fluid circulating line 100 than the EGR side heat exchanging unit 300, the working fluid additionally receives heat while sequentially passing through the exhaust side heat exchanging unit 400 and the EGR side heat exchanging unit 300.

The working fluid in the gas state is supplied to the turbine 510 through a turbine introducing pipe 304 to thereby rotate the turbine 510 and the working fluid losing energy by rotating the turbine 510 passes through the recuperator 50 and is returned to the inlet 62 of the reservoir tank 60.

The turbine 510 is rotated by receiving energy from the working fluid circulating line 100 and is one component of a turbine generating unit 500. A configuration and an operating scheme of the turbine generating unit 500 will be described below in detail.

The recuperator 50 is fluid-communicated with both the inlet 62 and the outlet 64 of the reservoir tank 60 to thereby perform the heat-exchange between the working fluid introduced to the reservoir tank 60 and the working fluid flew out from the reservoir tank 60 with each other.

In view of the working fluid flew out from the outlet 64 of the reservoir tank 60, this working fluid is heated by receiving heat from the working fluid which passes through the turbine 510 and is then introduced to the recuperator 50. On the other hand, in view of the working fluid which passes through the turbine 510 and is then introduced to the recuperator 50, this working fluid is cooled by the working fluid flew out from the outlet 64 of the reservoir tank 60. As such, the recuperator 50 is disposed at an upstream side of the reservoir tank 60 based on the inlet 62 of the reservoir tank 60 and is disposed at a downstream side of the reservoir tank 60 based on the outlet 64 of the reservoir tank 60, such that it may allow the working fluid supplied to the reservoir tank 60 to be stably supplied in a liquid state, pre-heat the working fluid before supplying the working fluid to the exhaust side heat exchanging unit 400, and increase efficiency of exhaust heat collection.

The working fluid circulating line 100 may include a TEG condenser 370 and a cooling fan 360. The TEG condenser 370 is disposed between the inlet 62 of the reservoir tank 60 and recuperator 50 to take away the amount of heat from the working fluid, thereby playing a predetermined role in making the working fluid flowing into the reservoir tank 60 into the liquid state. In addition, a pipe between the recuperator 50 and the TEG condenser 370 is configured of a working fluid radiator which is bent by a plurality of times, and the working fluid may further be cooled by blowing a stream of air into the working fluid radiator by the cooling fan 360.

Meanwhile, the working fluid pump 70 is disposed between the reservoir tank 60 and the recuperator 50, wherein in the case in which the working fluid flowing in the pipe connecting the reservoir tank 60 and the working fluid pump 70 to each other is vaporized by absorbing heat from the surrounding, pumping efficiency may be decreased. In order to prevent the decrease in pumping efficiency as described above, the pipe connecting the reservoir tank 60 and the working fluid pump 70 to each other may be insulated.

In the working fluid circulating line 100, a point on a turbine introducing pipe 304 which is a conduit connecting the turbine 510 to the EGR side heat exchanging unit 300 and a point between the turbine 510 and the recuperator 50 are connected to each other by a working fluid bypass 350, and the working fluid bypass 350 is installed with a working fluid bypass valve 352 selectively bypassing the working fluid to the recuperator 50.

In the case in which the working fluid exceeds a specific temperature or pressure, a molecular structure thereof may be destroyed, thereby losing unique material property thereof. As such, in the case in which the working fluid may lose unique material property, in order to recover the working fluid before it passes through the turbine 510, the working fluid is supplied to the recuperator 50 using the working fluid bypass valve 352. The working fluid bypassed to the recuperator 50 may pass through the recuperator 50 and may be returned to the normal state.

It is ideal to circulate only the working fluid in the working fluid circulating line 100, but a working fluid of a high temperature needs to rotate the turbine 510 and the turbine 510 is lubricated by a turbine lubricating oil to prevent the turbine 510 from being damaged while rotating at high speed. Therefore, the working fluid passing through the turbine 510 may be mixed with the turbine lubricating oil and an oil separator 302 for separating other fluids other than the working fluid, including the turbine lubricating oil discharged from the turbine 510 from the working fluid circulating line 100 may be formed at the pipe between the turbine 510 and the recuperator 50.

In the internal combustion engine having a turbo charger mounted thereon, as shown in FIG. 1, the exhaust gas discharged through the exhaust manifold 3 rotates an exhaust turbine 6B formed on an end portion of the exhaust manifold 3 of the exhaust pipe 404 at high speed and rotates a compressor 6A formed coaxially with the exhaust turbine 6B, such that a supercharged air may be introduced into an intake manifold 2 through an intercooler 5 and an engine radiator 4. The exhaust gas passing through the exhaust turbine 6B may sequentially pass through an exhaust aftertreatment device 402 and the exhaust heat exchanging unit 400 through the exhaust pipe 404 to thereby be discharged to the outside of the internal combustion engine. Here, the exhaust aftertreatment device 402, which is installed at the exhaust line to decrease contaminant of the exhaust gas, may have a catalytic converter, an activated charcoal, and the like embedded therein.

In order for the exhaust aftertreatment device 402 to purify the exhaust gas, in the most case, the temperature of the exhaust gas needs to be high. On this account, the exhaust heat exchanging unit 400 may be formed at a lower side of the exhaust aftertreatment device 402 installed at the exhaust line.

The discharging path of the exhaust gas in the internal combustion engine having the turbo charger mounted thereon has been described with reference to FIG. 1. However, in a case of a natural intake type internal combustion engine in which the compressor 6A and the exhaust turbine 6B, and the like are not formed, the exhaust gas discharged from the exhaust manifold 3 may sequentially pass through the exhaust aftertreatment device 402 and the exhaust heat exchanging unit 400 through the exhaust pipe 404 to thereby be discharged to the outside of the internal combustion engine.

Hereinafter, a scheme using torque of the turbine 510 which is rotated by the working fluid will be described mainly based on the configuration and the operating scheme of the turbine generating unit 500.

The system of recycling according to various embodiments of the present invention has the turbine generating unit 500, wherein the turbine generating unit 500 generally includes a turbine 510, a clutch 520, a motor generator 530, and a pulley 540.

The turbine 510 and a rotor of the motor generator 530 are coaxially connected to each other and the clutch 520 serves to mechanically intermit the turbine 510 and the pulley 540.

In the case in which the temperature of the EGR gas is the reference temperature T1 or more, the turbine generating unit 500 may drive a rotation shaft 6 installed in the internal combustion engine by directly using rotational energy of the turbine 510. Here, the rotation shaft 6 installed in the internal combustion engine may refer to a main driving shaft of the engine 1 transferring the driving force to wheels, but is not necessarily limited thereto, and may be a shaft driving apparatuses additionally mounted in the engine 1 of an air conditioner pump, a cooling water pump, or the like and operated using the torque. The rotational energy from the turbine 510 may be transferred to the rotation shaft 6 through a belt 8, wherein a chain or a gear may be used instead of the belt 8.

Meanwhile, in the case in which the temperature of the EGR gas is the reference temperature T1 or more, the motor generator 530 of the turbine generating unit 500 may convert the rotational energy of the turbine 510 into electrical energy and may store the converted electrical energy in a battery 20. In the case in which the clutch 520 releases the turbine 510 and the pulley 540 from each other, the rotation of the turbine 510 is used to only generate power, and in the case in which the clutch 520 connects the turbine 510 and the pulley 540 to each other, the torque of the turbine 510 may be used to generate power and apply the driving force to the rotation shaft 6 installed in the internal combustion engine.

In the case in which the temperature of the EGR gas is less than the reference temperature T1, the motor generator 530 may receive power from the battery 20 to thereby drive the rotation shaft 6 installed in the internal combustion engine. In the case in which the temperature of the EGR gas is less than the reference temperature T1, since the circulation of the working fluid is stopped in the working fluid circulating line 100 and the working fluid does not rotate the turbine 510, the motor generator 530 may receive power from the battery 20 without having any interference from the working fluid circulating line 100 to thereby generate the torque, and the torque may rotate the rotational shaft 6 through the belt 8.

Meanwhile, a gear train 7 of the engine 1 may be installed with a driving force transferring unit 40 so as to be engaged therewith, wherein the driving force transferring unit 40 may be used to receive power from the battery 20 through inverter 30 to thereby start the engine 1, and serve as a driving source assisting the engine 1 to thereby to increase an output of the engine 1 or decrease a load of the engine 1, thereby making it possible to serve to improve fuel efficiency of the engine 1.

Meanwhile, the turbine generating unit 500 may further include a second clutch 540 capable of mechanically intermitting the turbine 510 and the motor generator 530. In the case in which the working fluid rotates the turbine 510 because the temperature of the EGR gas is the reference temperature T1 or more, when a period in which the torque of the turbine 510 is converted into the electrical energy becomes excessively long, the battery 20 may be overcharged. In this case, the second clutch 540 may mechanically release the turbine 510 and the motor generator 530, and the turbine 510 is continuously rotated in a state in which it is mechanically released from the motor generator 530. In this case, the turbine 510 is not allowed to idle and drives the rotational shaft 6 installed in the internal combustion engine, such that the rotational energy of the turbine 510 may be maximally utilized without being wasted.

In the case in which the working fluid rotates the turbine 510 because the temperature of the EGR gas is the reference temperature T1 or more, when a voltage of the battery 20 is dropped to a preset charge initiating reference voltage, the system of recycling may be configured so that the second clutch 540 may again mechanically connect the turbine 510 and the motor generator 530 to each other to thereby charge the battery 20.

According to various embodiments of the present invention, the system of recycling exhaust heat from the internal combustion engine capable of achieving good fuel efficiency by deriving the optimal condition of circulating the working fluid or stopping the circulation thereof may be provided. In addition, the torque of the turbine generated by the working fluid may be used as an application suitable for the internal combustion engine.

For convenience in explanation and accurate definition in the appended claims, the terms "upper" or "lower", and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A system of recycling exhaust heat from an internal combustion engine, the system comprising:
    an EGR line configured to recirculate a portion of an exhaust gas generated by the internal combustion engine, from the exhaust manifold to an intake manifold;
    a working fluid circulating line configured to have a working fluid satisfying a Rankine cycle, which is circulated therein;
    an EGR heat exchanging unit configured to perform a heat-exchange between the portion of the exhaust gas flowing in the EGR line and the working fluid flowing in the working fluid circulating line;
    an EGR bypass valve configured to be installed in the EGR line and when the EGR bypass valve is opened, by a controller, configured to recirculate the portion of the exhaust gas to the intake manifold via the EGR heat exchanging unit and when the EGR bypass valve is closed, by the controller, configured to recirculate the portion of the exhaust gas to the intake manifold by bypassing the EGR heat exchanging unit;
    sensors configured to sense a temperature of the portion of the exhaust gas; and
    a turbine generating unit configured to have a turbine which is rotated by receiving energy from the working fluid circulating line;
    wherein:
        the turbine generating unit further includes a motor generator, a pulley and a clutch;
        the motor generator drives a rotation shaft, by the controller, installed in the internal combustion engine by directly using rotational energy of the turbine or converts the rotational energy into electrical energy when the temperature of the portion of the exhaust gas is equal to or greater than the reference temperature T1, and drives the rotation shaft, by the controller, installed in the internal combustion engine by receiving power from a battery when the temperature of the portion of the exhaust gas is less than the reference temperature T1;
        the turbine and a rotor of the motor generator are coaxially connected to each other; and
        the clutch intermits the turbine and the pulley,
    wherein when the temperature of the portion of the exhaust gas is equal to or greater than the reference temperature T1, the EGR bypass valve is opened, by the controller, and
    wherein when the temperature of the portion of the exhaust gas is less than the reference temperature T1, the EGR bypass valve is closed, by the controller.

2. The system according to claim 1, wherein the reference temperature T1 is 500° C.

3. The system according to claim 1, further comprising a working fluid pump configured to pump the working fluid from a reservoir tank having the working fluid stored therein to thereby supply the pumped working fluid to the working fluid circulating line;
    wherein the working fluid pump is operated, by the controller, only when the temperature of the portion of the exhaust gas is equal to or greater than the reference temperature T1.

4. The system according to claim 1, wherein the turbine generating unit further includes a second clutch mechanically intermitting the turbine and the motor generator, and
    when the battery is over-charged in which the working fluid rotates the turbine, the second clutch mechanically releases the turbine and the motor generator from each other.

5. The system according to claim 4, wherein when the turbine is mechanically released from the motor generator by the second clutch, the turbine drives the rotation shaft installed in the internal combustion engine.

6. The system according to claim 4, wherein when a voltage of the battery is dropped to or below a preset charge initiating reference voltage in which the working fluid rotates the turbine, the second clutch mechanically connects the turbine and the motor generator to each other.

7. The system according to claim 1, further comprising an exhaust heat exchanging unit configured to be installed at an exhaust line discharging the exhaust gas to an outside to thereby transfer heat from the exhaust gas to the working fluid.

8. The system according to claim 7, wherein the exhaust heat exchanging unit is disposed at an upstream side of the working fluid circulating line than the EGR heat exchanging unit.

9. The system according to claim 8, wherein the working fluid always passes through the exhaust heat exchanging unit.

* * * * *